United States Patent
Yamamoto et al.

(10) Patent No.: US 9,409,568 B2
(45) Date of Patent: Aug. 9, 2016

(54) HYBRID VEHICLE DRIVE APPARATUS

(75) Inventors: Masafumi Yamamoto, Toyota (JP); Atsushi Tabata, Okazaki (JP); Koichi Okuda, Toyota (JP); Keita Imai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 40 days.

(21) Appl. No.: 14/415,239

(22) PCT Filed: Jul. 17, 2012

(86) PCT No.: PCT/JP2012/068131
§ 371 (c)(1),
(2), (4) Date: Jan. 16, 2015

(87) PCT Pub. No.: WO2014/013555
PCT Pub. Date: Jan. 23, 2014

(65) Prior Publication Data
US 2015/0183423 A1  Jul. 2, 2015

(51) Int. Cl.
*B60W 20/00* (2016.01)
*B60K 6/365* (2007.10)
(Continued)

(52) U.S. Cl.
CPC .............. *B60W 20/40* (2013.01); *B60K 6/365* (2013.01); *B60K 6/387* (2013.01); *B60K 6/445* (2013.01);
(Continued)

(58) Field of Classification Search
CPC ........ B60K 6/365; B60K 6/387; B60K 6/445; B60W 10/06; B60W 10/08; B60W 10/12; B60W 20/00; B60W 20/40; Y10T 477/23
See application file for complete search history.

(56) References Cited

U.S. PATENT DOCUMENTS

| | | | | |
|---|---|---|---|---|
| 2012/0197472 | A1* | 8/2012 | He | B60K 6/105 701/22 |
| 2015/0165891 | A1* | 6/2015 | Kumazaki | B60K 6/383 475/5 |
| 2015/0202953 | A1* | 7/2015 | Iwase | B60K 6/383 475/5 |

FOREIGN PATENT DOCUMENTS

| | | |
|---|---|---|
| JP | 02-020450 | 1/1990 |
| JP | 2005-199942 A | 7/2005 |

(Continued)

OTHER PUBLICATIONS

Written Opinion of the International Search Authority issued Aug. 28, 2012 in PCT/JP2012/068131 filed Jul. 17, 2012.

(Continued)

*Primary Examiner* — Derek D Knight
(74) *Attorney, Agent, or Firm* — Oblon, McClelland, Maier & Neustadt, L.L.P.

(57) ABSTRACT

A hybrid vehicle drive apparatus includes an engine, a transmission unit, and a differential unit. A dual-motor travel is possible by stopping the engine and driving a first rotating machine and a second rotating machine as a result of engaging a first engaging element and a second engaging element of the transmission unit. At a time of switching to a dual-motor travel, the hybrid vehicle drive apparatus executes a first control for carrying out a negative RPM control by the first rotating machine; a second control for engaging either one of a first engaging element and a second engaging element of the transmission unit; and a third control for engaging both of the first engaging element and the second engaging element of the transmission unit after the first control and the second control.

8 Claims, 8 Drawing Sheets

(51) Int. Cl.

| | | |
|---|---|---|
| *B60K 6/445* | (2007.10) | |
| *B60W 10/08* | (2006.01) | |
| *B60K 6/387* | (2007.10) | |
| *B60W 10/12* | (2012.01) | |
| *B60W 10/06* | (2006.01) | |
| *B60K 6/38* | (2007.10) | |
| *F16H 37/08* | (2006.01) | |

(52) U.S. Cl.
CPC ............... *B60W 10/06* (2013.01); *B60W 10/08* (2013.01); *B60W 10/12* (2013.01); *B60W 20/00* (2013.01); *B60K 2006/381* (2013.01); *F16H 2037/0873* (2013.01); *F16H 2200/2007* (2013.01); *F16H 2200/2035* (2013.01); *Y02T 10/6239* (2013.01); *Y10S 903/93* (2013.01); *Y10T 477/23* (2015.01)

(56) References Cited

FOREIGN PATENT DOCUMENTS

| | | |
|---|---|---|
| JP | 2006-298066 A | 11/2006 |
| JP | 2009-190694 A | 8/2009 |

OTHER PUBLICATIONS

International Search Report issued Aug. 28, 2012 in PCT/JP2012/068131 filed Jul. 17, 2012.

\* cited by examiner

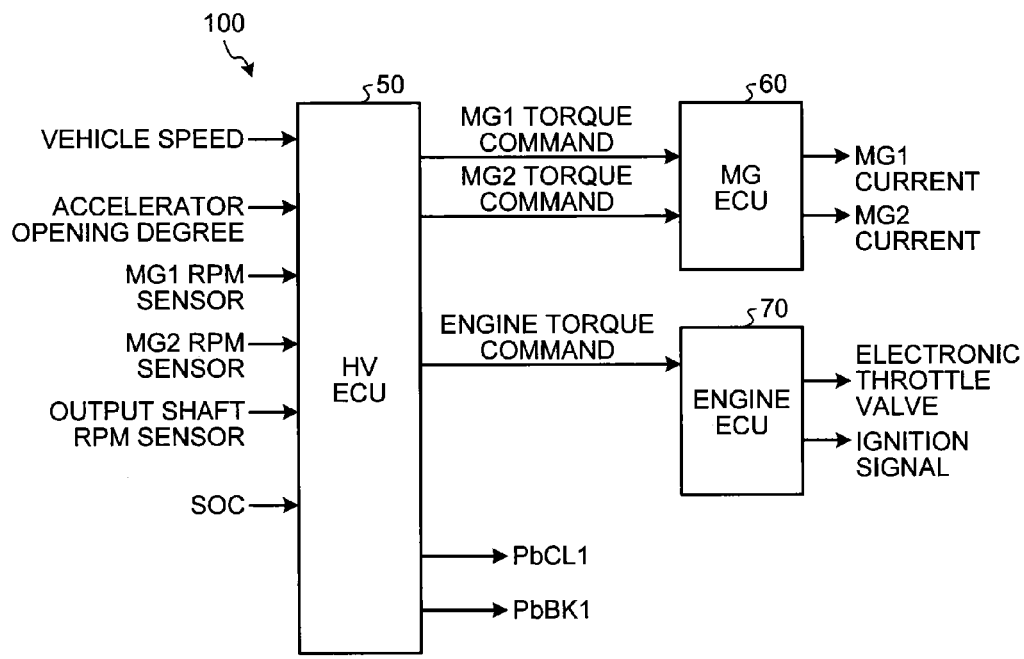

| | DRIVE STATE | | CL1 | BK1 | MG1 | MG2 |
|---|---|---|---|---|---|---|
| EV | FORWARD TRAVEL | SINGLE-MOTOR | △ | △ | G | M |
| | | DUAL-MOTOR | ○ | ○ | M | M |
| | REARWARD TRAVEL | SINGLE-MOTOR | | | | M |
| | | DUAL-MOTOR | ○ | ○ | M | M |
| HV | FORWARD TRAVEL | DIFFERENTIAL LOW | ○ | | G | M |
| | | DIFFERENTIAL HIGH | | ○ | G | M |
| | REARWARD TRAVEL | LOW | ○ | | G | M |

○: ENGAGEMENT
△: EITHER ONE IS ENGAGED WHEN ENGINE BRAKE IS USED TOGETHER
G: MAINLY ACTING AS GENERATOR AT THE TIME OF DRIVE
M: MAINLY ACTING AS MOTOR AT THE TIME OF DRIVE

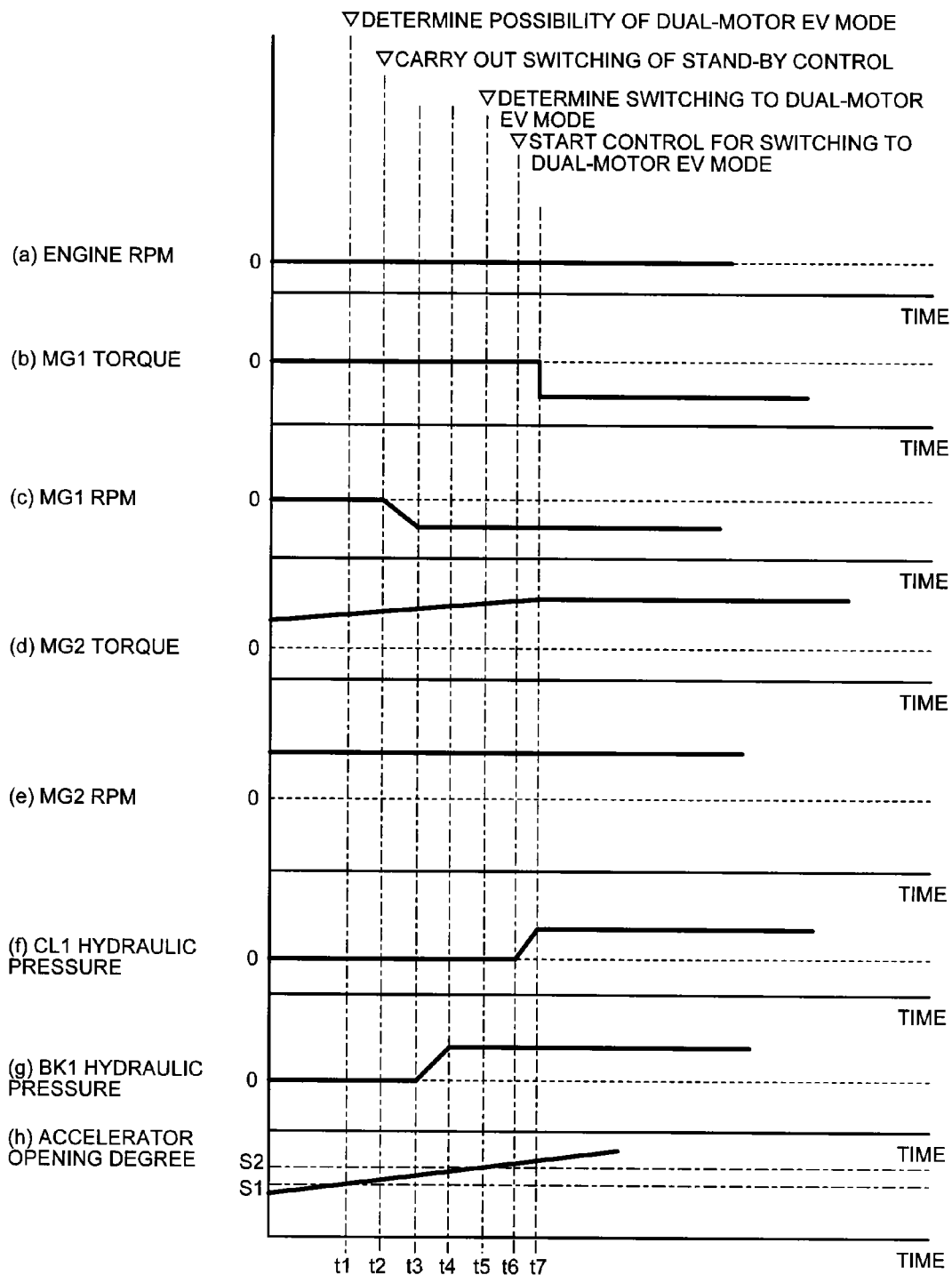

HYBRID VEHICLE DRIVE APPARATUS

FIELD

The present invention relates to a hybrid vehicle drive apparatus.

BACKGROUND

Conventionally, hybrid vehicles including a transmission mechanism have been known. For example, Patent Literature 1 discloses a technology of a drive apparatus of a hybrid vehicle including a transmission mechanism for changing the rotation speed of an internal combustion engine and transmitting the rotation to a power distribution mechanism, a first transmission shaft for transmitting the power from the internal combustion engine to the transmission mechanism, and a second transmission shaft for transmitting the power output from the transmission mechanism to the power distribution mechanism. The transmission mechanism of Patent Literature 1 has a differential mechanism in which two sets of planetary gear mechanisms are combined, a first brake capable of stopping the rotation of a ring gear R1 of the differential mechanism, a second brake capable of stopping the rotation of a ring gear R2, and a clutch for connecting and disconnecting the power transmission from the first transmission shaft to the ring gear R1.

CITATION LIST

Patent Literature

Patent Literature 1: Japanese Laid-open Patent Publication No. 2009-190694

SUMMARY

Technical Problem

In hybrid vehicles including a mechanism capable of changing the rotation speed of an engine, it is preferable that a drive apparatus can be simplified. For example, it is preferable to be able to realize a simple configuration as well as a travel using two rotating electric machines as power sources.

Further, in the drive apparatus described in Patent Literature 1, a mode of the transmission mechanism is switched by engaging/disengaging engaging elements such as brakes and clutches. In the apparatus, since the energy necessary to the engagement is excessively consumed when, for example, plural engaging elements are engaged at the same time, a loss is worse. Thus, there is a room for improving responsiveness at the time of switching a mode of the transmission mechanism.

An object of the invention, which was made in view of the circumstances, is to provide a hybrid vehicle drive apparatus capable of improving responsiveness at the time of switching a mode in a mechanism for changing the rotation speed of an engine.

Solution to Problem

To solve the above-described problem, a hybrid vehicle drive apparatus according to the present invention includes: an engine, a transmission unit, and a differential unit, wherein an output shaft of the engine is coupled to an input shaft of the transmission unit, a first element of the differential unit is coupled to an output element of the transmission unit, a second element of the differential unit is coupled to a first rotating machine, and a third element of the differential unit is coupled to a second rotating machine, a dual-motor travel is possible by stopping the engine and driving the first rotating machine and the second rotating machine as a result of engaging a first engaging element and a second engaging element of the transmission unit, and at a time of switching to the dual-motor travel, the hybrid vehicle drive apparatus executes: a first control for carrying out a negative RPM control by the first rotating machine; a second control for engaging either one of the first engaging element and the second engaging element of the transmission unit; and a third control for engaging both of the first engaging element and the second engaging element of the transmission unit after the first control and the second control.

Moreover, in the above-described hybrid vehicle drive apparatus, it is preferable that the hybrid vehicle drive apparatus executes the first control and the second control when switching to the dual-motor travel is predicted, and the third control when the switching to the dual-motor travel is carried out.

Moreover, in the above-described hybrid vehicle drive apparatus, it is preferable that a single-motor travel is possible by stopping the engine and driving the second rotating machine, and the hybrid vehicle drive apparatus executes, at a time of the single-motor travel, a control for making the RPM of the first rotating machine to 0.

Advantageous Effects of Invention

At the time of switching to the dual-motor travel that requires to engage both the first engaging element and the second engaging element of the transmission unit, since the hybrid vehicle drive apparatus according to the present invention engages one of the first engaging element or the second engaging element and thereafter engages the other engaging element, the energy necessary to the engagement can be reduced as compared with the case in which both the engaging elements are engaged at the same time and an effect of improving responsiveness of switching can be achieved.

BRIEF DESCRIPTION OF DRAWINGS

FIG. 2 is an input/output relation diagram of the vehicle according to the embodiment.

FIG. 3 is a view illustrating an operation engagement table of a hybrid vehicle drive apparatus according to the embodiment.

FIG. 11 is a time chart according to the control of switching from the single-motor EV mode to the dual-motor EV mode of the embodiment.

DESCRIPTION OF EMBODIMENTS

Figure 1:
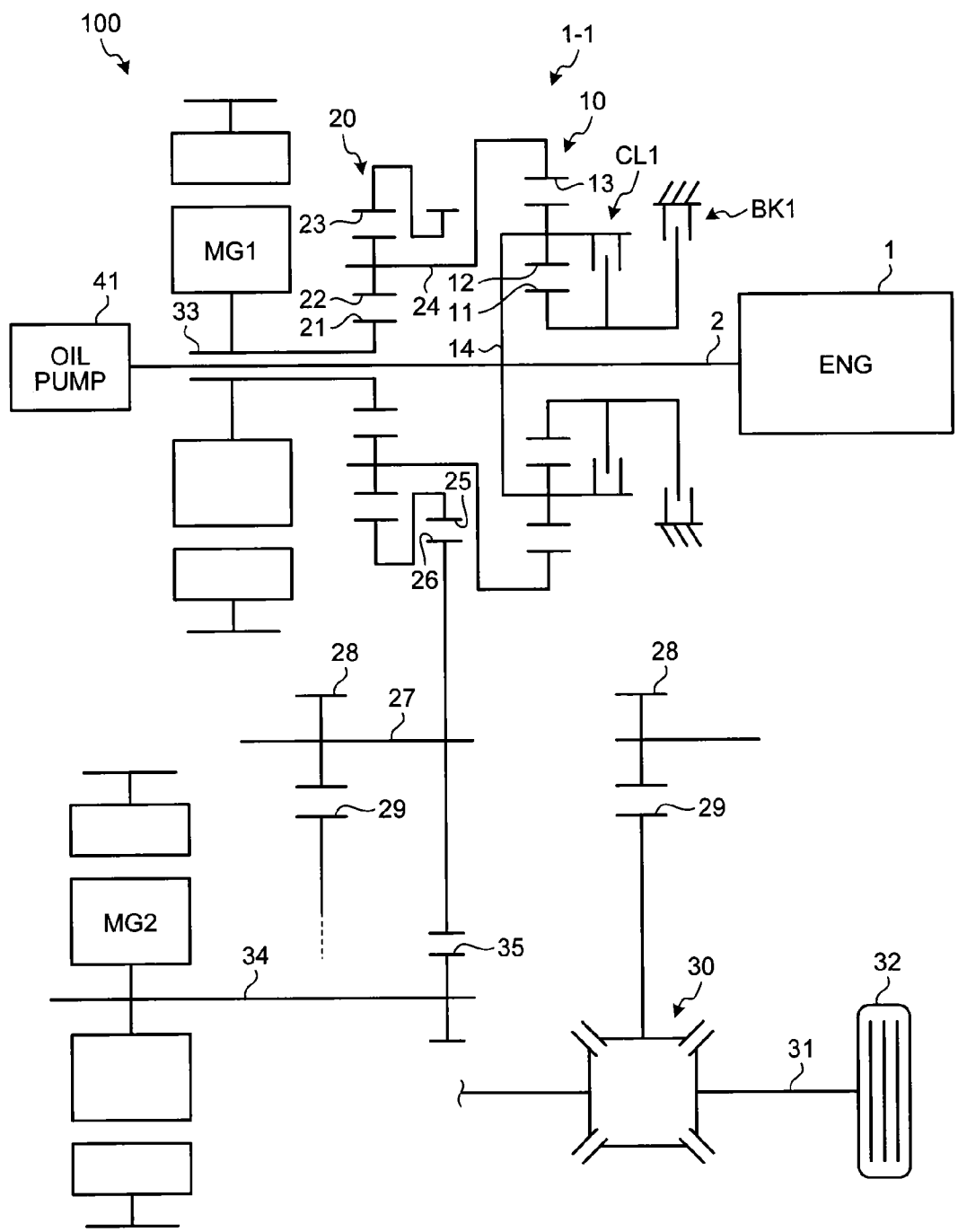
FIG. 1 is a skeleton diagram of a vehicle according to an embodiment of the present invention.

An embodiment of a hybrid vehicle drive apparatus according to the present invention will be described below based on the drawings. Note that, in the following drawings, the same or corresponding portions are denoted by the same reference numerals and the description thereof is not repeated.

First, a configuration of the hybrid vehicle drive apparatus according to the embodiment of the invention will be described. FIG. 1 is a skeleton diagram of a vehicle according to the embodiment and FIG. 2 is an input/output relation diagram of the vehicle according to the embodiment.

A vehicle 100 according to the embodiment is a hybrid vehicle including an engine 1, a first rotating electric machine MG1, and a second rotating electric machine MG2 as power sources. The vehicle 100 may be a plug-in hybrid vehicle that can be charged from an external power supply. As illustrated in FIG. 1 and FIG. 2, the vehicle 100 is configured to include the engine 1, a first planetary gear mechanism 10, a second planetary gear mechanism 20, the first rotating electric machine MG1, the second rotating electric machine MG2, a clutch CL1, a brake BK1, a HV_ECU 50, a MG_ECU 60, and an engine_ECU 70.

Further, a hybrid vehicle drive apparatus 1-1 according to the embodiment is configured to include the first planetary gear mechanism 10, the second planetary gear mechanism 20, the clutch CL1, and the brake BK1. The hybrid vehicle drive apparatus 1-1 may be configured to further include the controllers such as the respective ECUs 50, 60, 70. The hybrid vehicle drive apparatus 1-1 can be applied to an FF (front engine-front drive) vehicle or an RR (rear engine-rear drive) vehicle, and the like. The hybrid vehicle drive apparatus 1-1 is mounted on the vehicle 100 so that, for example, an axial direction becomes a vehicle width direction.

In the hybrid vehicle drive apparatus 1-1 according to the embodiment, a transmission unit is configured to include the first planetary gear mechanism 10, the brake BK1 (a first engaging element) and the clutch CL1 (a second engaging element). Further, a differential unit is configured to include the second planetary gear mechanism 20. Further, a switching device for changing the speed of the first planetary gear mechanism 10 is configured to include the clutch CL1 and the brake BK1.

The engine 1 as an engine converts the combustion energy of fuel to the rotating motion of an output shaft and outputs the rotating motion. An output shaft of the engine 1 is connected to an input shaft 2. The input shaft 2 is an input shaft of a power transmission device. The power transmission device is configured to include the first rotating electric machine MG1, the second rotating electric machine MG2, the clutch CL1, the brake BK1, a differential device 30. The input shaft 2 is disposed coaxially with the output shaft of the engine 1 on a line extended from the output shaft. The input shaft 2 is connected to a first carrier 14 of the first planetary gear mechanism 10. Further, the output shaft of the engine 1 is connected to a mechanical oil pump 41 via the input shaft 2. The mechanical oil pump 41 is configured to be driven using the engine 1 as a driving source and to supply oil to a hydraulic control circuit that will be described later referring to FIG. 8. The mechanical oil pump 41 is disposed coaxially with the engine 1, the first planetary gear mechanism 10, the second planetary gear mechanism 20, and the first rotating electric machine MG1, and confronts the engine 1 across the first planetary gear mechanism 10, the second planetary gear mechanism 20, and the first rotating electric machine MG1.

The first planetary gear mechanism 10 of the embodiment is connected to the engine 1 and corresponds to a power transmission mechanism for transmitting the rotation of the engine 1. Illustrated here as an example of the power transmission mechanism is the first planetary gear mechanism 10 that is the differential mechanism. The first planetary gear mechanism 10 is mounted on the vehicle 100 as a first differential mechanism. The first planetary gear mechanism 10 is an input side differential mechanism disposed closer to the engine 1 side than the second planetary gear mechanism 20. The first planetary gear mechanism 10 can change the rotation speed of the engine 1 and output the rotation. The first planetary gear mechanism 10 is of a single pinion type and includes a first sun gear 11, a first pinion gear 12, a first ring gear 13, and the first carrier 14.

The first ring gear 13 is disposed coaxially with the first sun gear 11 and more externally than the first sun gear 11 in the radial direction thereof. The first pinion gear 12 is disposed between the first sun gear 11 and the first ring gear 13 and meshed with the first sun gear 11 and the first ring gear 13, respectively. The first pinion gear 12 is rotatably supported by the first carrier 14. The first carrier 14 is coupled to the input shaft 2, and is rotated integrally with the input shaft 2. Accordingly, the first pinion gear 12 can revolve around the central axis line of the input shaft 2 together with the first carrier 14 (revolution) and can rotate on the central axis line of the first pinion gear 12 (rotation) by being supported by the first carrier 14.

The clutch CL1 is a clutch device capable of coupling the first sun gear 11 with the first carrier 14. Although the clutch CL1 can be configured as, for example, a friction engagement type clutch, the clutch CL1 is not restricted thereto. A known clutch device such as a mesh type clutch may be used as the clutch CL1. The clutch CL1 is engaged or disengaged by being controlled by, for example, hydraulic pressure. The clutch CL1 in a completely engaged state can couple the first sun gear 11 with the first carrier 14 and integrally rotate the first sun gear 11 and the first carrier 14. The clutch CL1 in the completely engaged state regulates the differential motion of the first planetary gear mechanism 10. In contrast, the clutch CL1 in a disengaged state separates the first sun gear 11 from the first carrier 14 and allows the relative rotation of the first sun gear 11 and the first carrier 14. Namely, the clutch CL1 in the engaged state allows the differential motion of the first planetary gear mechanism 10. Note that the clutch CL1 can be controlled in a semi-engaged state.

The brake BK1 is a brake device capable of regulating the rotation of the first sun gear 11. The brake BK1 includes an engaging element connected to the first sun gear 11 and an engaging element connected to a vehicle body side, for example, to a case of the power transmission device. Although the brake BK1 can be configured as the friction engagement type clutch device similar to the clutch CL1, the brake BK1 is not restricted thereto. The known clutch device such as the mesh type clutch may be used as the brake BK1. The brake BK1 is engaged or disengaged by being controlled by, for example, hydraulic pressure. The brake BK1 in a completely engaged state can couple the first sun gear 11 with the vehicle body side and regulate the rotation of the first sun gear 11. In contrast the brake BK1 in a disengaged state separates the first sun gear 11 from the vehicle body side and allows the rotation of the first sun gear 11. Note that the brake BK1 can be controlled in a semi-engaged state.

The second planetary gear mechanism 20 of the embodiment corresponds to the differential mechanism for connecting the first planetary gear mechanism 10 and driving wheels 32. The second planetary gear mechanism 20 is mounted on the vehicle 100 as a second differential mechanism. The second planetary gear mechanism 20 is an output side differential mechanism disposed closer to the driving wheels 32 side than the first planetary gear mechanism 10. The second planetary gear mechanism 20 is of a single pinion type and includes a second sun gear 21, a second pinion gear 22, a second ring gear 23, and a second carrier 24. The second planetary gear mechanism 20 is disposed coaxially with the first planetary gear mechanism 10 and confronts the engine 1 across the first planetary gear mechanism 10 each other.

The second ring gear 23 is disposed coaxially with the second sun gear 21 and more externally than the second sun gear 21 in the radial direction thereof. The second pinion gear 22 is disposed between the second sun gear 21 and the second ring gear 23 and meshed with the second sun gear 21 and the second ring gear 23, respectively. The second pinion gear 22 is rotatably supported by the second carrier 24. The second carrier 24 is connected to the first ring gear 13, and is rotated integrally with the first ring gear 13. The second pinion gear 22 can revolve around the central axis line of the input shaft 2 together with the second carrier 24 (revolution), and can rotate on the central axis line of the second pinion gear 22 (rotation) by being supported by the second carrier 24. The first ring gear 13 is an output element of the first planetary gear mechanism 10 and can output the rotation, which has been input from the engine 1 to the first planetary gear mechanism 10, to the second carrier 24. The second carrier 24 corresponds to the first rotating element connected to the output element of the first planetary gear mechanism 10.

A rotating shaft 33 of the first rotating electric machine MG1 is connected to the second sun gear 21. The rotating shaft 33 of the first rotating electric machine MG1 is disposed coaxially with the input shaft 2, and is rotated integrally with the second sun gear 21. The second sun gear 21 corresponds to a second rotating element connected to the first rotating electric machine MG1. A counter drive gear 25 is connected to the second ring gear 23. The counter drive gear 25 is an output gear rotated integrally with the second ring gear 23. The second ring gear 23 corresponds to a third rotating element connected to the second rotating electric machine MG2 and the driving wheels 32. The second ring gear 23 is an output element that can output the rotation, which has been input from the first rotating electric machine MG1 or the first planetary gear mechanism 10, to the driving wheels 32.

The counter drive gear 25 is meshed with a counter driven gear 26. The counter driven gear 26 is connected to a drive pinion gear 28 via a counter shaft 27. The counter driven gear 26 and the drive pinion gear 28 are rotated integrally with each other. Further, a reduction gear 35 is meshed with the counter driven gear 26. The reduction gear 35 is connected to a rotating shaft 34 of the second rotating electric machine MG2. Namely, the rotation of the second rotating electric machine MG2 is transmitted to the counter driven gear 26 via the reduction gear 35. The reduction gear 35 has a diameter smaller than the counter driven gear 26, and transmits the rotation of the second rotating electric machine MG2 to the counter driven gear 26 after having reduced the rotation speed.

The drive pinion gear 28 is meshed with a differential ring gear 29 of the differential device 30. The differential device 30 is connected to the driving wheels 32 via right/left drive shafts 31. The second ring gear 23 is connected to the driving wheels 32 via the counter drive gear 25, the counter driven gear 26, the drive pinion gear 28, the differential device 30, and the drive shafts 31. Further, the second rotating electric machine MG2 is connected to a power transmission path between the second ring gear 23 and the driving wheels 32 and can transmit power to the second ring gear 23 and to the driving wheels 32, respectively.

The first rotating electric machine MG1 and the second rotating electric machine MG2 have a function as a motor (electric motor) and a function as a generator, respectively. The first rotating electric machine MG1 and the second rotating electric machine MG2 are connected to a battery via an inverter. The first rotating electric machine MG1 and the second rotating electric machine MG2 can convert the electric power supplied from the battery to mechanical power and output the mechanical power and further convert the mechanical power to electric power by being driven by the power input thereto. The electric power generated by the rotating electric machines MG1, MG2 can be stored in the battery. As the first rotating electric machine MG1 and the second rotating electric machine MG2, for example, an AC synchronous motors/generators can be used.

In the vehicle 100 of the embodiment, the brake BK1, the clutch CL1, the first planetary gear mechanism 10, the counter drive gear 25, the second planetary gear mechanism 20, and the first rotating electric machine MG1 are disposed coaxially with the engine 1, in this order from the side closer to the engine 1. Further, the hybrid vehicle drive apparatus 1-1 of the embodiment is configured as a plural shaft type in which the input shaft 2 and the rotating shaft 34 of the second rotating electric machine MG2 are disposed on different shafts.

As illustrated in FIG. 2, the vehicle 100 includes the HV_ECU 50, the MG_ECU 60, and the engine_ECU 70. Each of the ECUs 50, 60, and 70 is an electronic control unit including a computer. The HV_ECU 50 has a function for integrally controlling the vehicle 100 in its entirety. The MG_ECU 60 and the engine_ECU 70 are electrically connected to the HV_ECU 50.

The MG_ECU 60 can control the first rotating electric machine MG1 and the second rotating electric machine MG2. The MG_ECU 60 can, for example, adjust the current value supplied to the first rotating electric machine MG1, control the output torque of the first rotating electric machine MG1, adjust the current value supplied to the second rotating electric machine MG2, and control the output torque of the second rotating electric machine MG2.

The engine_ECU 70 can control the engine 1. The engine_ECU 70 can, for example, control the opening degree of an electronic throttle valve of the engine 1, carry out the ignition control of the engine by outputting an ignition signal, and carry out a fuel injection control to the engine 1. The engine_ECU 70 can control the output torque of the engine 1 by the opening degree control, the injection control, the ignition control, and the like of the electronic throttle valve.

The HV_ECU 50 is connected with a vehicle speed sensor, an accelerator opening degree sensor, a MG1 RPM sensor, a MG2 RPM sensor, an output shaft RPM sensor, a battery sensor, and the like. These sensors allow the HV_ECU 50 to obtain a vehicle speed, an accelerator opening degree, an RPM of the first rotating electric machine MG1, an RPM of the second rotating electric machine MG2, an RPM of the output shaft of the power transmission device, a battery state SOC, and the like.

The HV_ECU 50 can calculate the drive force, the power, the torque, and the like that are requested to the vehicle 100, based on the obtained information. The HV_ECU 50 determines the output torque of the first rotating electric machine MG1 (hereinafter, described also as "MG1 torque"), the output torque of the second rotating electric machine MG2 (hereinafter, described also as "MG2 torque"), and the output torque of the engine 1 (hereinafter, described also as "engine torque") based on the request values having been calculated. The HV_ECU 50 outputs the command value of the MG1 torque and the command value of the MG2 torque to the MG_ECU 60. Further, the HV_ECU 50 outputs the command value of the engine torque to the engine_ECU 70.

The HV_ECU 50 controls the clutch CL1 and the brake BK1, respectively based on travel modes, and the like to be described later. The HV_ECU 50 outputs the command value (PbCL1) of the hydraulic pressure supplied to the clutch CL1 and the command value (PbBK1) of the hydraulic pressure supplied to the brake BK1 to a hydraulic controller 40 (refer to FIG. 9), respectively. The hydraulic controller 40 controls the hydraulic pressures supplied to the clutch CL1 and the brake BK1 according to the respective command values PbCL1, PbBK1. A configuration of the hydraulic controller 40 will be described later with reference to FIG. 9.

FIG. 3 is a view illustrating an operation engagement table of the hybrid vehicle drive apparatus 1-1 according to the embodiment. In the vehicle 100, a hybrid (HV) travel or an EV travel can be selectively executed. The HV travel is a travel mode for causing the vehicle 100 to travel using the engine 1 as the power source. In the HV travel, the second rotating electric machine MG2 may be further used as the power source in addition to the engine 1.

The EV travel is a travel mode for carrying out a travel using at least any one of the first rotating electric machine MG1 and the second rotating electric machine MG2 as the power source. In the EV travel, it is possible to carry out a travel while stopping the engine 1. The hybrid vehicle drive apparatus 1-1 according to the embodiment has, as the EV travel mode, a single-motor EV mode for causing the vehicle 100 to travel using the second rotating electric machine MG2 as a single power source, and a dual-motor EV mode for causing the vehicle 100 to travel using the first rotating electric machine MG1 and the second rotating electric machine MG2 as the power sources.

Figure 4:
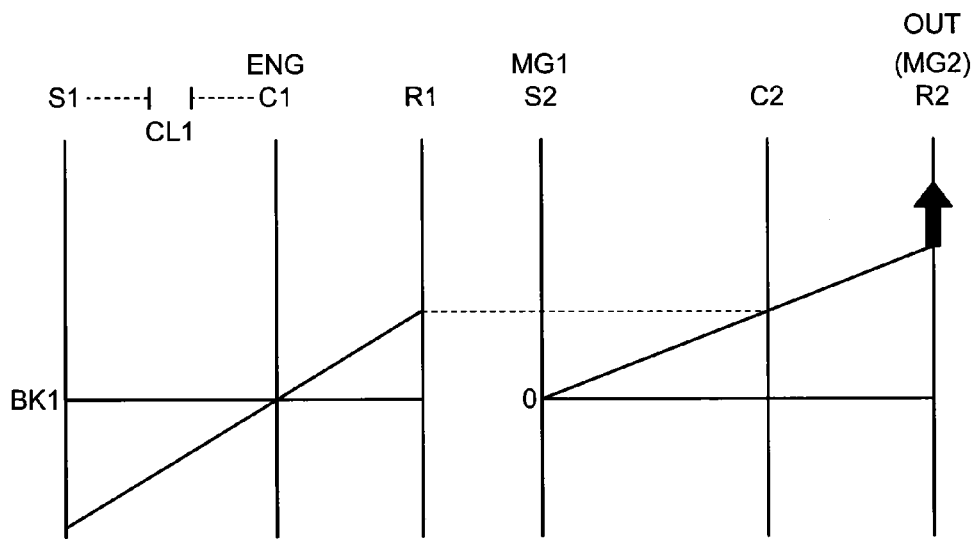
FIG. 4 is a collinear diagram according to a single-motor EV mode.

In the engagement table of FIG. 3, the circular symbols in the column of the clutch CL1 and the circular symbols in the column of the brake BK1 show engagement and blank columns show disengagement. Further, triangular symbols show that any of the engagement and disengagement can be executed. The single-motor EV mode is executed by disengaging, for example, the clutch CL1 and the brake BK1 together. FIG. 4 is a collinear diagram according to the single-motor EV mode. In the collinear diagram, reference numerals S1, C1, and R1 show the first sun gear 11, the first carrier 14, and the first ring gear 13, respectively, and reference numerals S2, C2, and R2 show the second sun gear 21, the second carrier 24, and the second ring gear 23, respectively.

In the single-motor EV mode, the clutch CL1 and the brake BK1 are disengaged. Disengaging the brake BK1 allows the rotation of the first sun gear 11, and disengaging the clutch CL1 allows the differential motion of the first planetary gear mechanism 10. The HV_ECU 50 causes the second rotating electric machine MG2 to output positive torque via the MG_ECU 60, thereby generating a drive force in a forward direction to the vehicle 100. The second ring gear 23 positively rotates in association with the rotation of the driving wheels 32. Here, the positive rotation refers to the rotating direction of the second ring gear 23 when the vehicle 100 travels forward. The HV_ECU 50 reduces a dragging loss by causing the first rotating electric machine MG1 to operate as the generator. Specifically, the HV_ECU 50 causes the first rotating electric machine MG1 to generate electric power by applying a slight amount of torque thereto and makes the RPM of the first rotating electric machine MG1 to 0. With the operation, the dragging loss of the first rotating electric machine MG1 can be reduced.

The first ring gear 13 positively rotates together with the second carrier 24. Since the first planetary gear mechanism 10 is in a neutral state in which the clutch CL1 and the brake BK1 are disengaged, the engine 1 is not rotated together and the rotation of the first carrier 14 is stopped. Thus, a large amount of regeneration can be obtained. The first sun gear 11 negatively rotates and rotates idly. Note that the neutral state of the first planetary gear mechanism 10 is a state in which no power is transmitted between the first ring gear 13 and the first carrier 14, that is, a state in which the engine 1 is separated from the second planetary gear mechanism 20 and the transmission of power is cut off. When at least any one of the clutch CL1 and the brake BK1 is engaged, the first planetary gear mechanism 10 is placed in a connected state in which the engine 1 is connected to the second planetary gear mechanism 20.

At the time of travel in the single-motor EV mode, a case may occur in which the battery is fully charged and regeneration energy cannot be obtained. In the case, it is contemplated to use an engine brake at the same time. Connecting the engine 1 to the driving wheels 32 by engaging the clutch CL1 or the brake BK1 allows the engine brake to be applied to the driving wheels 32. As shown by the triangular symbols in FIG. 3, engaging the clutch CL1 or the brake BK1 in the single-motor EV mode places the engine 1 in a together-rotating state, thereby an engine brake state can be achieved by increasing the engine RPM by the first rotating electric machine MG1.

Figure 5:
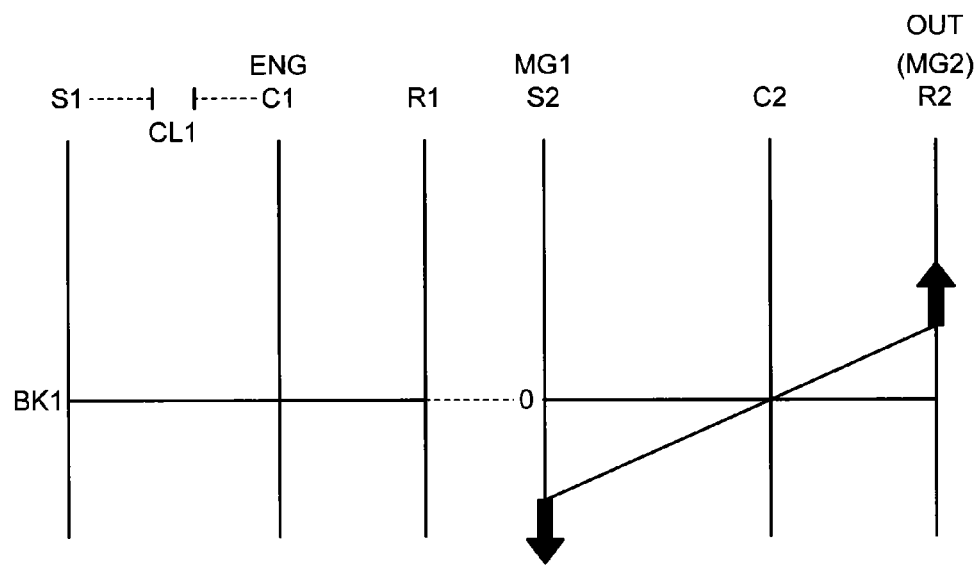
FIG. 5 is a collinear diagram according to a dual-motor EV mode.

In the dual-motor EV mode, the HV_ECU 50 engages the clutch CL1 and the brake BK1. FIG. 5 is a collinear diagram according to the dual-motor EV mode. Engaging the clutch CL1 regulates the differential motion of the first planetary gear mechanism 10, and engaging the brake BK1 regulates the rotation of the first sun gear 11. Accordingly, the rotations of all the rotating elements of the first planetary gear mechanism 10 stop. Regulating the rotation of the first ring gear 13 as an output element locks the second carrier 24 connected thereto to have 0 rotation.

The HV_ECU 50 causes the first rotating electric machine MG1 and the second rotating electric machine MG2 to output respective traveling and driving torques. When the rotation of the second carrier 24 is regulated, a reaction force is removed from the torque of the first rotating electric machine MG1 so that the torque of the first rotating electric machine MG1 can be output from the second ring gear 23. When the first rotating electric machine MG1 negatively rotates by outputting negative torque at the time of forward travel, the second ring gear 23 can be caused to output positive torque. In contrast, at the time of backward travel, when the first rotating electric machine MG1 positively rotates by outputting positive torque, the second ring gear 23 can be caused to output negative torque.

Figure 6:
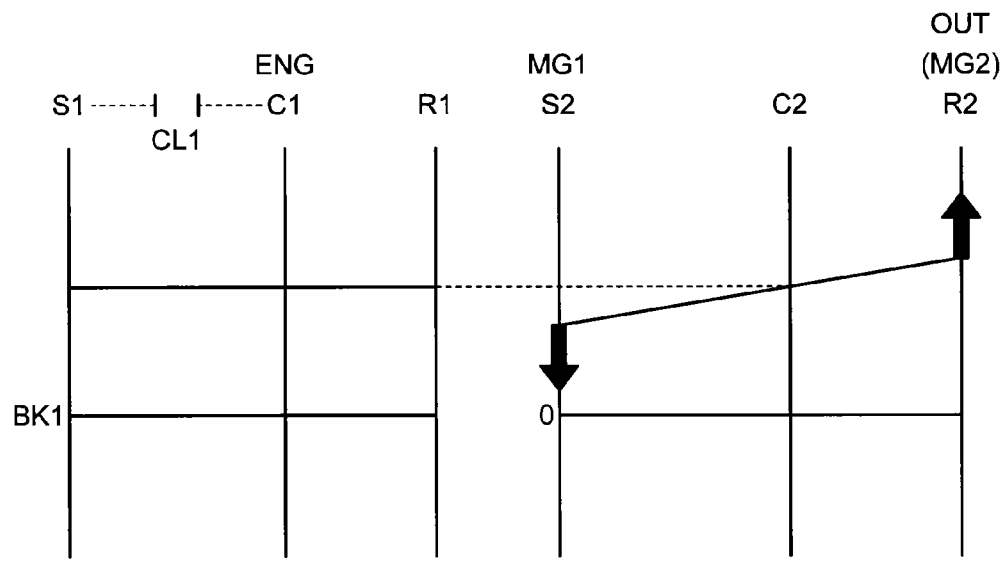
FIG. 6 is a collinear diagram according to a HV travel mode in a low state.
Figure 7:
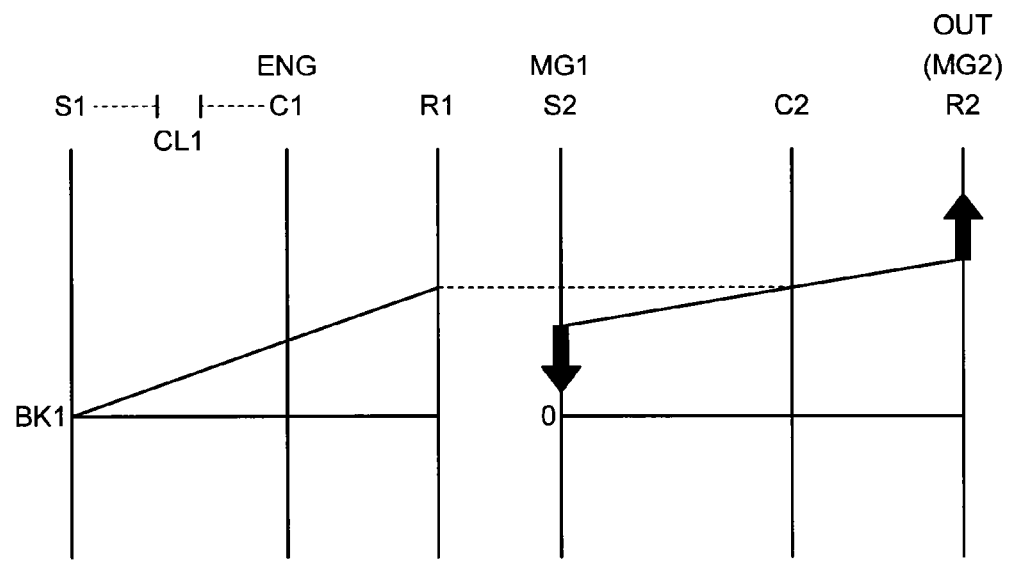
FIG. 7 is a collinear diagram according to the HV travel mode in a high state.

In the HV travel, the second planetary gear mechanism 20 as the differential unit uses its operating state as a base, and the first planetary gear mechanism 10 of the transmission unit is switched between low and high. FIG. 6 is a collinear diagram according to the HV travel mode in the low state (hereinafter, described also as "HV low mode"), and FIG. 7 is a collinear diagram according to the HV travel mode in the high state (hereinafter, described also as "HV high mode").

In the HV low mode, the HV_ECU 50 engages the clutch CL1 and disengages the brake BK1. The differential motion of the first planetary gear mechanism 10 is regulated by engaging the clutch CL1 so that the respective rotating elements 11, 13, and 14 are integrally rotated. Accordingly, the rotation of the engine 1 is neither increased nor reduced and is transmitted from the first ring gear 13 to the second carrier 24 at a constant speed.

In contrast, in the HV high mode, the HV_ECU 50 disengages the clutch CL1 and engages the brake BK1. Engaging the brake BK1 regulates the rotation of the first sun gear 11. Thus, the first planetary gear mechanism 10 is placed in an over-driven (OD) state in which the rotation of the engine 1 input to the first carrier 14 is increased and output from the first ring gear 13. As described above, the first planetary gear mechanism 10 can increase and output the rotation of the engine 1. The gear ratio of the first planetary gear mechanism 10 at the time of overdrive can be set to, for example, 0.7.

As described above, the switching device including the clutch CL1 and the brake BK1 changes the speed of the first planetary gear mechanism 10 by switching between the state for regulating the differential motion of the first planetary gear mechanism 10 and the state for allowing the differential motion of the first planetary gear mechanism 10.

Figure 8:
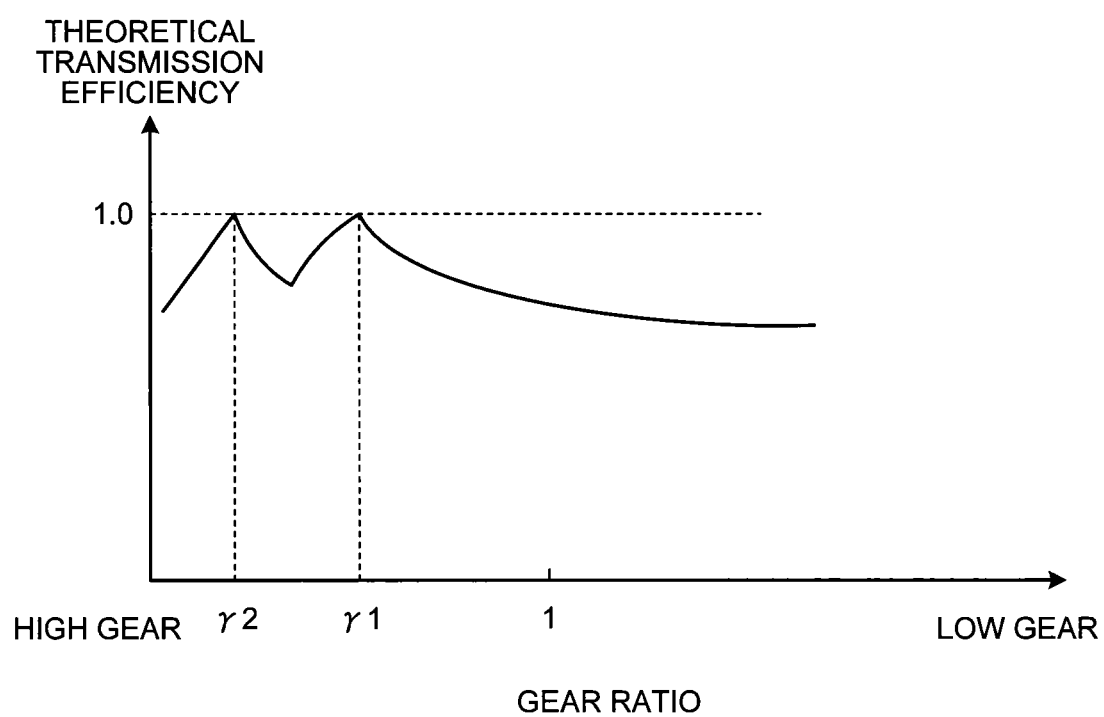
FIG. 8 is a view illustrating a theoretical transmission efficiency diagram according to the embodiment.

The HV_ECU 50 selects the HV high mode, at, for example, a high vehicle speed and selects the HV low mode at a medium/low vehicle speed. In the embodiment, changing the rotation speed of the engine 1 and outputting the rotation by switching the HV high mode and the HV low mode provides two mechanical points to be described later, which can improve fuel consumption. FIG. 8 is a view illustrating a theoretical transmission efficiency line according to the embodiment.

In FIG. 8, a horizontal axis shows a gear ratio and a vertical axis shows theoretical transmission efficiency. The gear ratio is a ratio (speed reducing ratio) of the input side RPMs of the planetary gear mechanisms 10, 20 to the output side RPMs thereof and shows, for example, a ratio of the RPM of the first carrier 14 to the RPM of the second ring gear 23. In the horizontal axis, a left side is a high gear side where the gear ratio is small and a right side is a low gear side where the gear ratio is large. The theoretical transmission efficiency becomes the maximum efficiency 1.0 when the power input to the planetary gear mechanisms 10, 20 is entirely transmitted to the counter drive gear 25 by a mechanical transmission without via an electric path.

A curve illustrated in FIG. 8 is the theoretical transmission efficiency line of the HV travel mode when the HV high mode and the HV low mode are appropriately switched. For example, in the same gear ratio, any of the HV high mode and the HV low mode, which is a mode with higher efficiency, is selected. Relatively, the right side illustrates the theoretical transmission efficiency line in the HV low mode and the left side illustrates the theoretical transmission efficiency line in the HV high mode. The transmission efficiency of the HV low mode becomes the maximum efficiency at a gear ratio $\gamma 1$. At the gear ratio $\gamma 1$, the RPM of the first rotating electric machine MG1 (the second sun gear 21) becomes 0. For this reason, at the gear ratio $\gamma 1$, since an electric path due to the reception of reaction force by the first rotating electric machine MG1 is 0, the power can be transmitted from the engine 1 to the counter drive gear 25 only by mechanically transmitting the power. The gear ratio $\gamma 1$ is a gear ratio on an overdrive side, that is, a gear ratio smaller than 1. The gear ratio $\gamma 1$ is described, herein, also as "a first mechanical transmission gear ratio $\gamma 1$".

The theoretical transmission efficiency of the HV high mode becomes the maximum efficiency at a gear ratio $\gamma 2$. In the HV high mode, since the RPM of the first rotating electric machine MG1 (the second sun gear 21) becomes 0 at the gear ratio $\gamma 2$, the power can be transmitted from the engine 1 to the counter drive gear 25 only by mechanically transmitting the power. The gear ratio $\gamma 2$ is a gear ratio closer to the high gear side than the first mechanical transmission gear ratio $\gamma 1$. The gear ratio $\gamma 2$ is, herein, described also as "a second mechanical transmission gear ratio $\gamma 2$".

The theoretical transmission efficiency of the HV travel mode is more lowered as the gear ratio gets closer to the low gear side than the first mechanical transmission gear ratio $\gamma 1$. Further, the theoretical transmission efficiency of the HV travel mode is more lowered as the gear ratio gets closer to the high gear side than the second mechanical transmission gear ratio $\gamma 2$. The theoretical transmission efficiency of the HV travel mode is curved to a low efficiency side in the region of the gear ratio between the first mechanical transmission gear ratio $\gamma 1$ and the second mechanical transmission gear ratio $\gamma 2$.

As described above, the hybrid vehicle drive apparatus 1-1 according to the embodiment has two mechanical points closer to the high gear side than the gear ratio 1. Since the hybrid vehicle drive apparatus 1-1 includes the transmission unit including the first planetary gear mechanism 10, the clutch CL1, and the brake BK1, the hybrid vehicle drive apparatus 1-1 can generate a second mechanical point (the second mechanical transmission gear ratio $\gamma 2$) closer to the high gear side than the mechanical point (the first mechanical transmission gear ratio $\gamma 1$) when the engine 1 is directly coupled to the second carrier 24. Accordingly, the transmission efficiency at the time of high gear operation can be improved. Namely, a hybrid system can be realized, in which fuel consumption can be improved by improving the transmission efficiency at the time of high gear travel.

When the HV_ECU 50 switches the HV high mode and the HV low mode, the HV_ECU 50 carries out a cooperative gear change control for changing the speeds of the first planetary gear mechanism 10 and the second planetary gear mechanism 20 at the same time. In the cooperative gear change control, the HV_ECU 50 increases the gear ratio of one of the first planetary gear mechanism 10 and the second planetary gear mechanism 20 and reduces the gear ratio of the other thereof.

When the HV_ECU 50 switches the mode from the HV high mode to the HV low mode, the HV_ECU 50 changes the gear ratio of the second planetary gear mechanism 20 to the high gear side in synchronization with the switching of the mode. With the operation, the discontinuous change of the gear ratio from the engine 1 to the driving wheels 32 of the vehicle 100 is suppressed or reduced in their entireties so that the degree of change of the gear ratio can be reduced. The suppression of change of the gear ratio from the engine 1 to the driving wheels 32 can reduce the adjustment amount of the engine RPM due the gear change or can make it unnecessary to adjust the engine RPM. The HV_ECU 50 cooperatively changes the speeds of the first planetary gear mechanism 10 and the second planetary gear mechanism 20 so that the gear ratio of the vehicle 100 is continuously changed in its entirety to, for example, the low side.

In contrast, when the HV_ECU 50 switches the mode from the HV low mode to the HV high mode, the HV_ECU 50 changes the gear ratio of the second planetary gear mechanism 20 to the low gear side in synchronization with the switching of the mode. With the operation, the discontinuous change of the gear ratio in the vehicle 100 is suppressed or reduced in its entirety so that the degree of change of the gear ratio can be reduced. The HV_ECU 50 cooperatively changes the speeds of the first planetary gear mechanism 10 and the second planetary gear mechanism 20 so that the gear ratio of the vehicle 100 is continuously changed in its entirety to, for example, the high side.

The adjustment of the gear ratio of the second planetary gear mechanism 20 is carried out by, for example, the control of the RPM of the first rotating electric machine MG1. The HV_ECU 50 controls the first rotating electric machine MG1 to steplessly change the gear ratio between, for example, the input shaft 2 and the counter drive gear 25. With the operation, the entire section including the planetary gear mechanisms 10, 20, the first rotating electric machine MG1, the clutch CL1, and the brake BK1, namely, the transmission device including the differential unit and the transmission unit operates as an electric stepless transmission.

Figure 9:
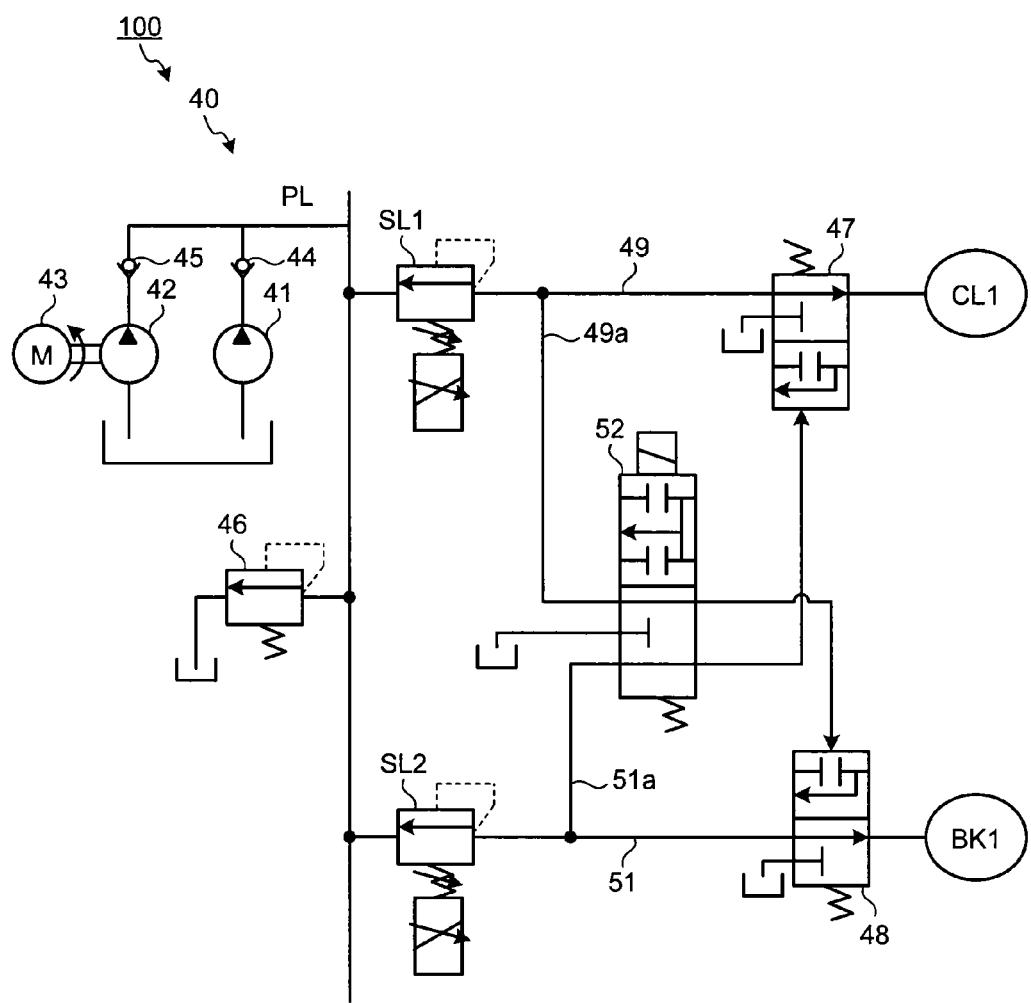
FIG. 9 is a view illustrating an example of a configuration of a hydraulic controller.

Next, the hydraulic controller 40 will be described referring to FIG. 9. FIG. 9 is a view illustrating an example of a configuration of the hydraulic controller. As illustrated in FIG. 9, the hydraulic controller 40 includes the mechanical oil pump 41 and an electric oil pump 42 as hydraulic pressure generation sources, and is connected so as to be able to supply the hydraulic pressure supplied from these hydraulic pressure generation sources to the clutch CL1 and the brake BK1. The hydraulic controller 40 includes a primary regulator valve 46, a first linear solenoid SL1, and a second linear solenoid SL2 as hydraulic pressure adjustment elements.

Further, the hydraulic controller 40 is configured to be able to switch between a state in which the hydraulic pressure can be supplied to one of the clutch CL1 and the brake BK1 and a state in which the hydraulic pressure can be supplied to both of the clutch CL1 and the brake BK1 at the same time, according to a command from the HV_ECU 50. The hydraulic controller 40 includes a first simultaneous engagement prevention valve 47, a second simultaneous engagement prevention valve 48, and an electromagnetic switch valve 52 as elements according to the switching of the states.

As also illustrated and described in FIG. 1, the mechanical oil pump 41 is connected to the output shaft of the engine 1 and driven by the engine 1. The hydraulic pressure output from the mechanical oil pump 41 is adjusted by the primary regulator valve 46 and makes a line pressure PL.

The electric oil pump 42 is driven by an electric motor 43. The electric motor 43 is controlled by the HV_ECU 50. During the EV travel, that is, in a state where the engine 1 stops and the mechanical oil pump 41 cannot be driven, the electric motor 43 is controlled so that the line pressure is generated by the electric oil pump 42. Further, the electric motor 43 is controlled so that no hydraulic pressure is generated from the electric oil pump 42 except that the electric oil pump 42 is intentionally driven in the EV travel.

Check valves 44, 45 are disposed on respective discharge paths of the mechanical oil pump 41 and the electric oil pump 42, providing a configuration which is able to prevent, when any one of the oil pumps discharge oil, the oil from flowing backward to the other oil pump.

The first linear solenoid SL1 is disposed on a supply path 49 to the clutch CL1 and adjusts the line pressure PL to the hydraulic pressure supplied to the clutch CL1. The second linear solenoid SL2 is disposed on a supply path 51 to the brake BK1 and adjusts the line pressure PL to the hydraulic pressure supplied to the brake BK1. The first linear solenoid SL1 and the second linear solenoid SL2 make engagement pressure with a direct compression type system.

The first simultaneous engagement prevention valve 47 is disposed downstream of the first linear solenoid SL1 of the supply path 49 to the clutch CL1. The first simultaneous engagement prevention valve 47 is connected with a branch path 51a from the supply path 51 of the brake BK1, and uses the pressure supplied to the brake BK1 as working pressure. The first simultaneous engagement prevention valve 47 is configured to operate when the hydraulic pressure supplied to the brake BK1 rises and to cut the hydraulic pressure supplied to the clutch CL1.

The second simultaneous engagement prevention valve 48 is disposed downstream of the second linear solenoid SL2 of the supply path 51 to the brake BK1. The second simultaneous engagement prevention valve 48 is connected with a branch path 49a from the supply path 49 of the clutch CL1 and uses the pressure supplied to the clutch CL1 as working pressure. The second simultaneous engagement prevention valve 48 is configured to operate when the hydraulic pressure supplied to the clutch CL1 rises, thereby cutting the hydraulic pressure supplied to the brake BK1.

The electromagnetic switch valve 52 is disposed on the branch paths 49a, 51a and switches between the connection and cut-off of the branch paths 49a, 51a, according to a command from the HV_ECU 50. The electromagnetic switch valve 52 operates so as to cut-off the branch paths 49a, 51a in the dual-motor EV mode in which it is necessary to engage the clutch CL1 and the brake BK1. With the operation, since the first simultaneous engagement prevention valve 47 and the second simultaneous engagement prevention valve 48 do not operate, the hydraulic pressure can be supplied to both the clutch CL1 and the brake BK1 at the same time.

In other modes in which it is sufficient to engage one of the clutch CL1 or the brake BK1, the electromagnetic switch valve 52 operates so as to communicate the branch paths 49a, 51a. With the operation, since the first simultaneous engagement prevention valve 47 and the second simultaneous engagement prevention valve 48 operate, the hydraulic pressure can be supplied to only one of the clutch CL1 or the brake BK1.

Next, a control of switching from the single-motor EV mode to the dual-motor EV mode of the hybrid vehicle drive apparatus 1-1 according to the embodiment will be described.

Figure 10:
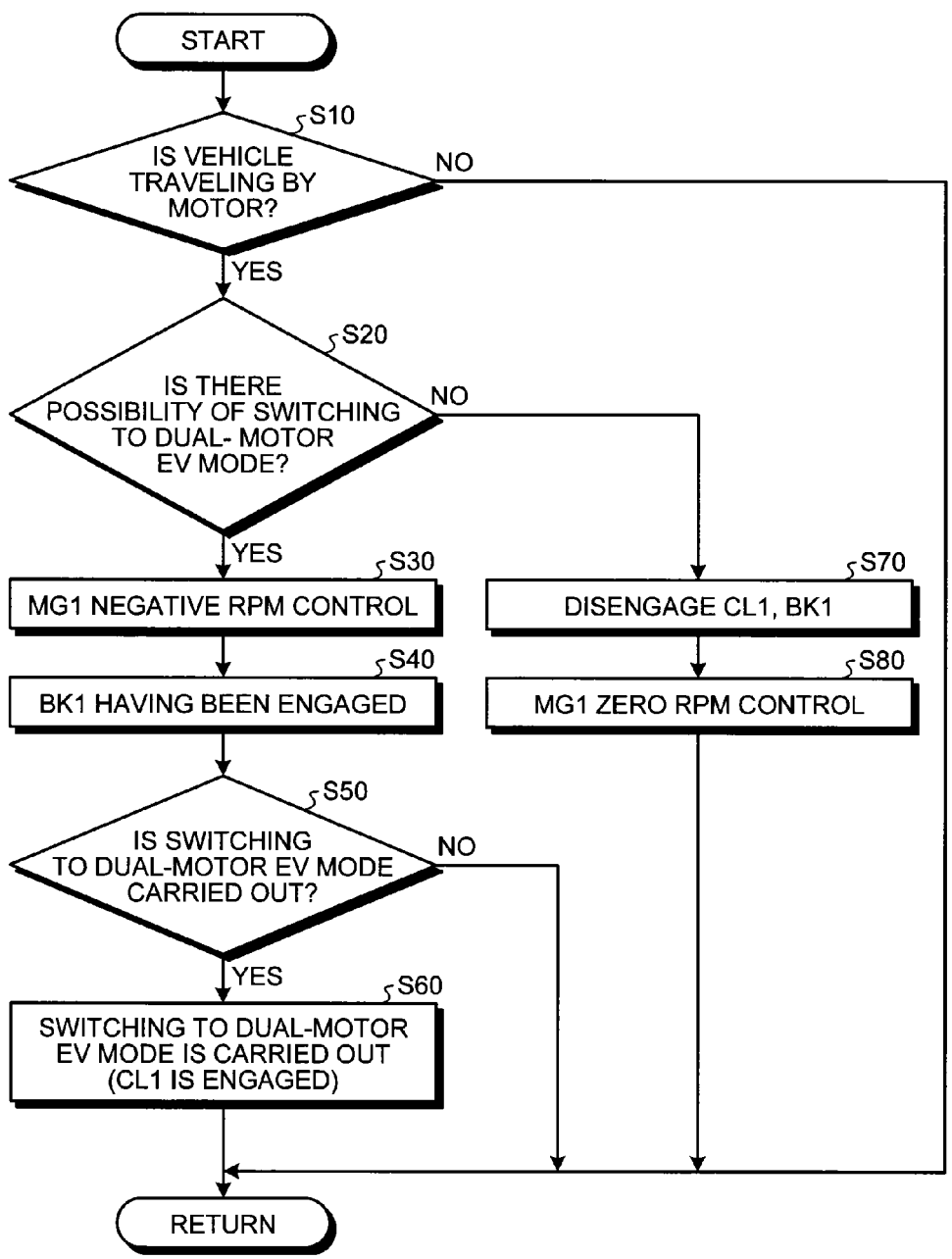
FIG. 10 is a flowchart according to a control of switching from the single-motor EV mode to the dual-motor EV mode of the embodiment.

When the single-motor EV mode (single-motor travel) is switched to the dual-motor EV mode (dual-motor travel), the EV_ECU 50 engages both the clutch CL1 and the brake BK1. In particular, in the embodiment, to improve the responsiveness at the time of mode switching carried out by reducing the energy necessary for the engagement, when switching to the dual-motor EV mode is predicted, the EV_ECU 50 engages the brake BK1 in advance and engages the remaining clutch CL1 when the switching to the dual-motor EV mode is actually carried out. The control of switching will be described referring to FIG. 10 and FIG. 11. FIG. 10 is s flowchart according to the control of switching from the single-motor EV mode to the dual-motor EV mode of the embodiment, and FIG. 11 is a time chart according to the control of switching from the single-motor EV mode to the dual-motor EV mode of the embodiment. In FIG. 11, (a) shows engine RPM, (b) shows MG1 torque, (c) shows RPM of first rotating electric machine MG1, (d) shows MG2 torque, (e) shows RPM of second rotating electric machine MG2, (f) shows hydraulic pressure of clutch CL1, (g) shows hydraulic pressure of brake BK1, and (h) shows accelerator opening degree. The control flow illustrated in FIG. 10 is executed by the HV_ECU 50 while traveling in, for example, the EV travel mode.

At step S10, whether or not the vehicle is traveling by motor is determined. The HV_ECU 50 confirms whether or not the travel mode of the vehicle at the time is the single-motor EV mode. When it is determined that the motor travel mode is being carried out as the result of determination at step S10 (step S10: Yes), a process goes to step S20, and otherwise (step S10: No) the control flow is finished. In FIG. 11, before a time t1, the engine 1 and the first rotating electric machine MG1 stop, the second rotating electric machine MG2 is driven, the single-motor EV mode is carried out by the second rotating electric machine MG2, and the affirmative determination is made at step S10.

At step S20, whether or not there is a possibility of switching to the dual-motor EV mode, in which both the first rotating electric machine MG1 and the second rotating electric machine MG2 are used, is determined. Since the dual-motor EV mode is carried out in a high load region, specifically, when the accelerator opening degree and the change rate thereof are large, whether or not there is the possibility of switching to the dual-motor EV mode can be determined using that a towing switch is turned on, and the like as a determination condition. Further, since the dual-motor EV mode is also carried out when efficiency becomes higher than the single-motor EV mode in which the MG2 is driven, even when both the modes have a small amount of efficiency difference, it can be determined that there is the possibility of switching to the dual-motor EV mode. As the result of determination at step S20, when it is determined that there is the possibility of switching to the dual-motor EV mode (step S20: Yes), the process goes to step S30, and otherwise (step S20: No) the process goes to step S70. In FIG. 11, the possibility of switching to the dual-motor EV mode is determined at the time t1 and the affirmative determination is carried out in response to a trigger showing that the accelerator opening degree has exceeded a threshold value S1.

At step S30, the negative RPM control of the first rotating electric machine MG1 is executed. In the negative RPM control, the RPM of the first rotating electric machine MG1 is controlled to a negative side so that the RPM of the second carrier 24 of the differential unit (the second planetary gear mechanism 20) is kept to 0. The RPM of the second carrier 24 can be controlled to be kept to 0 by driving the first rotating electric machine MG1 in a negative direction as illustrated in FIG. 5 from, for example, a state in which the second rotating electric machine MG2 is driven in a positive direction as illustrated in FIG. 4. The negative RPM control of the first rotating electric machine MG1 can control also the RPM of the first ring gear 13 of the transmission unit (the first planetary gear mechanism 10) connected to the second carrier 24 to 0 by controlling the RPM of the second carrier 24 to 0. Further, since the EV mode is being carried out and the engine 1 stops, the RPM of the first sun gear 11 is also controlled to 0 in association with the first ring gear 13. When step S30 is executed, the process goes to step S40. In FIG. 11, the RPM of the MG1 is increased in the negative direction from a time t2 to a time t3 and the negative RPM control is executed.

At step S40, the brake BK1 is engaged. When step S40 is executed, the process goes to step S50. In FIG. 11, the negative RPM control of the first rotating electric machine MG1 is executed, and when the RPM of the second carrier 24 has become 0 at the time t3, the hydraulic pressure of the brake BK1 increases from the time t3 to a time t4 and the brake BK1 is engaged. Note that, in the embodiment, the negative RPM control of the first rotating electric machine MG1 at step S30 and the engagement control of the brake BK1 at step S40 are also described as a stand-by control. In FIG. 11, the stand-by control is carried out between the time t2 and the time t4.

At step S50, whether or not switching to the dual-motor EV mode should be carried out is determined. Specifically, it can be determined that the switching to the dual-motor EV mode should be carried out provided that the accelerator opening degree becomes larger, a state in which the change rate of the accelerator opening degree is large is kept, and the accelerator opening degree becomes large from the state in which the towing switch has been turned on, and the like, in comparison with those at the time of determination at step S20. Further, when the efficiency of the dual-motor EV mode becomes better than the single-motor EV mode in which the MG2 is driven and the like, the switching to the dual-motor EV mode can be determined. As the result of determination at step S50, when it is determined to carry out the switching to the dual-motor EV mode (step S50: Yes), the process goes to step S60, and otherwise (step S50: No), the control flow is finished. In FIG. 11, the switching to the dual-motor EV mode is determined at a time t5 and the affirmative determination is carried out in response to a trigger showing that the accelerator opening degree has exceeded a threshold value S2 larger than the threshold value S1 for determining the possibility.

At step S60, the control of switching to the dual-motor EV mode is executed. Specifically, since the brake BK1 has been engaged at step S40, the remaining clutch CL1 is engaged. When step S60 is carried out, the control flow is finished. In FIG. 11, the hydraulic pressure of the clutch CL1 increases from a time t6 to a time t7 and the clutch CL1 is engaged.

When it is determined at step S20 that there is no possibility of switching to the dual-motor EV mode, at step S70, the clutch CL1 and the brake BK1 are disengaged together. When step S70 is executed, the process goes to step S80.

At step S80, the zero RPM control of the first rotating electric machine MG1 is executed. The first rotating electric machine MG1 is kept in the vicinity of the zero RPM, thereby the drag of the first rotating electric machine MG1 is prevented.

Note that when the negative RPM control of the MG1 at step S30 is executed in the control of switching to the dual-motor EV mode, the brake BK1 may be placed in a low pressure wait state together with the above control and thereafter the brake BK1 may be engaged at step S40 in the configuration. The low pressure wait state means a state in which a pack clearance is blocked without starting the engagement. Further, the brake BK1 may be placed in the low pressure wait state in place of engaging the brake BK1 at step S40. Note that the engagement control of the brake BK1 (or the control to the low pressure wait state) at step S40 may be carried out in parallel with the negative RPM control of the MG1 after the start of the negative RPM control of the MG1 at step S30.

Further, in the control of switching to the dual-motor EV mode, the timing of engagement of the brake BK1 may be replaced with the timing of engagement of the clutch CL1. In that case, the clutch CL1 is engaged at step S40 and the brake BK1 is engaged at step S60. Namely, when the switching to the dual-motor EV mode is predicted, it is sufficient that first one of the brake BK1 or the clutch CL1 is engaged previously and the remaining other one is engaged when the switching to the dual-motor EV mode is actually carried out.

Further, in the control of switching to the dual-motor EV mode, the processing at step S30 corresponds to a first control for carrying out the negative RPM control by the first rotating electric machine MG1, the processing at step S40 corresponds to a second control for engaging any one of the brake BK1 and the clutch CL1 of the transmission unit after the start of the first control, and the processing at step S60 corresponds to a third control for engaging both the brake BK1 and the clutch CL1 of the transmission unit after the second control.

Next, an effect of the hybrid vehicle drive apparatus 1-1 according to the embodiment will be described.

The hybrid vehicle drive apparatus 1-1 according to the embodiment includes: the engine 1; the transmission unit including the first planetary gear mechanism 10, the clutch CL1 and the brake BK1; and the differential unit including the second planetary gear mechanism 20. The output shaft of the engine 1 is coupled to the input shaft 2 of the transmission unit. The second carrier 24 of the differential unit is coupled to the first ring gear 13 of the transmission unit, the second sun gear 21 is coupled to the first rotating electric machine MG1, and the second ring gear 23 is coupled to the second rotating electric machine MG2. The hybrid vehicle drive apparatus 1-1 can stop the engine 1 by engaging both the clutch CL1 and the brake BK1 of the transmission unit, and allow the dual-motor EV mode travel by driving the first rotating electric machine MG1 and the second rotating electric machine MG2. At the time of switching to the dual-motor EV mode, executed are the first control for carrying out the negative RPM control by the first rotating electric machine MG1, the second control for engaging any one of the brake BK1 and the clutch CL1 of the transmission unit after the start of the first control, and the third control for engaging both the brake BK1 and the clutch CL1 of the transmission unit after the second control.

With the configuration, at the time of switching to the dual-motor EV mode in which it is necessary to engage both the clutch CL1 and brake BK1 of the transmission unit, since one of the clutch CL1 and the brake BK1 is engaged and thereafter the other thereof is engaged, the energy necessary for the engagement can be reduced in comparison with the case in which both the clutch CL1 and the brake BK1 are engaged at the same time. Thereby, the responsiveness at the time of switching a mode can be improved. Further, when the clutch CL1 or the brake BK1 is previously engaged at the time of switching a mode from the single-motor EV mode to the dual-motor EV mode, a state in which the inertia of the engine 1 varies is generally contemplated. In contrast, according to the configuration described above, first, the RPM of the second carrier 24 is made to 0 by carrying out the negative RPM control of the MG1 by the first control to thereby control the RPMs of the first ring gear 13 and the first sun gear 11 also to 0, and thereafter the clutch CL1 or the brake BK1 is engaged by the second control. With the operation, the variation of inertia of the engine 1 at the time of engagement of the clutch CL1 or the brake BK1 can be suppressed so that drivability can be improved.

Further, in the hybrid vehicle drive apparatus 1-1 of the embodiment, when the switching to the dual-motor EV mode travel is predicted, the first control and the second control will be carried out. When the switching to the dual-motor EV mode travel is carried out, the third control is executed.

With the configuration, since one of the clutch CL1 and the brake BK1 can be engaged before the switching to the dual-motor EV mode travel is actually carried out, the switching to the dual-motor EV mode travel can be promptly carried out. Thereby, the responsiveness of the switching can be more improved.

Further, the hybrid vehicle drive apparatus 1-1 of the embodiment can carry out the single-motor EV mode travel by stopping the engine 1 and driving the second rotating electric machine MG2. At the time of the single-motor EV mode travel, the MG1 zero RPM control for controlling the RPM of the first rotating electric machine MG1 to 0 is carried out. With the configuration, the drag of the first rotating electric machine MG1 can be reduced at the time of EV travel.

Although the embodiment of the present invention has been described above, the embodiment is presented as an example and does not intend to restrict the invention. The embodiment can be carried out by other various modes and can be variously omitted, replaced, and changed within the scope which does not depart from the gist of the invention. The embodiment and modifications thereof are included in the scope and gist of the invention, and further included in the description of the invention in the appended claims and in the scope of the equivalent thereof.

REFERENCE SIGNS LIST 1-1 HYBRID VEHICLE DRIVE APPARATUS
1 ENGINE
10 FIRST PLANETARY GEAR MECHANISM (TRANSMISSION UNIT)
13 FIRST RING GEAR (OUTPUT ELEMENT)
14 FIRST CARRIER
20 SECOND PLANETARY GEAR MECHANISM (DIFFERENTIAL UNIT)
21 SECOND SUN GEAR (SECOND ELEMENT)
23 SECOND RING GEAR (THIRD ELEMENT)
24 SECOND CARRIER (FIRST ELEMENT)
32 DRIVING WHEEL
50 HV_ECU
60 MG_ECU
70 ENGINE ECU
100 VEHICLE
BK1 BRAKE (FIRST ENGAGING ELEMENT)
CL1 CLUTCH (SECOND ENGAGING ELEMENT)
MG1 FIRST ROTATING ELECTRIC MACHINE
MG2 SECOND ROTATING ELECTRIC MACHINE

The invention claimed is:

1. A hybrid vehicle drive apparatus comprising:
an engine, a transmission unit, and a differential unit, wherein
an output shaft of the engine is coupled to an input shaft of the transmission unit;
a first element of the differential unit is coupled to an output element of the transmission unit, a second element of the differential unit is coupled to a first rotating machine, and a third element of the differential unit is coupled to a second rotating machine;
a dual-motor travel is possible by stopping the engine and driving the first rotating machine and the second rotating machine as a result of engaging a first engaging element and a second engaging element of the transmission unit; and
at a time of switching to the dual-motor travel, the hybrid vehicle drive apparatus executes:
a first control for carrying out a negative RPM control by the first rotating machine;
a second control for engaging either one of the first engaging element and the second engaging element of the transmission unit; and
a third control for engaging both of the first engaging element and the second engaging element of the transmission unit after the first control and the second control.

2. The hybrid vehicle drive apparatus according to claim 1, wherein the hybrid vehicle drive apparatus executes
the first control and the second control when switching to the dual-motor travel is predicted, and
the third control when the switching to the dual-motor travel is carried out.

3. The hybrid vehicle drive apparatus according to claim 1, wherein
a single-motor travel is possible by stopping the engine and driving the second rotating machine, and
the hybrid vehicle drive apparatus executes, at a time of the single-motor travel, a control for making the RPM of the first rotating machine to 0.

4. The hybrid vehicle drive apparatus according to claim 2, wherein a single-motor travel is possible by stopping the engine and driving the second rotating machine, and the hybrid vehicle drive apparatus executes, at a time of the single-motor travel, a control for making the RPM of the first rotating machine to 0.

5. A hybrid vehicle drive apparatus comprising:

an engine including an output shaft;

a first rotating machine and a second rotating machine which are capable of a dual-motor travel;

a transmission unit comprising:
- an input shaft coupled to the output shaft,
- an output element,
- a first engaging element, and
- a second engaging element, wherein the engine is stopped by engaging of both of the first engaging element and the second engaging element;

a differential unit comprising:
- a first element coupled to the output element,
- a second element coupled to the first rotating machine, and
- a third element coupled to the second rotating machine; and a controller configured to execute, at a time of switching to the dual-motor travel, a first control for carrying out a negative RPM control by the first rotating machine, a second control for engaging either one of the first engaging element and the second engaging element of the transmission unit, and a third control for engaging both of the first engaging element and the second engaging element of the transmission unit after the first control and the second control.

6. The hybrid vehicle drive apparatus according to claim 5, wherein the controller executes the first control and the second control when switching to the dual-motor travel is predicted, and executes the third control when the switching to the dual-motor travel is carried out.

7. The hybrid vehicle drive apparatus according to claim 5, wherein a single-motor travel is possible by stopping the engine and driving the second rotating machine, and the controller executes, at a time of the single-motor travel, a control for making the RPM of the first rotating machine to 0.

8. The hybrid vehicle drive apparatus according to claim 6, wherein a single-motor travel is possible by stopping the engine and driving the second rotating machine, and the controller executes, at a time of the single-motor travel, a control for making the RPM of the first rotating machine to 0.

* * * * *